United States Patent
James

(10) Patent No.: US 8,636,269 B2
(45) Date of Patent: Jan. 28, 2014

(54) METHOD AND MATERIALS FOR IMPROVING EVAPORATIVE HEAT EXCHANGERS

(75) Inventor: Robert Wilton James, Crafers (AU)

(73) Assignee: FF Seeley Nominees Pty Ltd, St. Mary's S.A. (AU)

( * ) Notice: Subject to any disclaimer, the term of this patent is extended or adjusted under 35 U.S.C. 154(b) by 149 days.

(21) Appl. No.: 13/082,993

(22) Filed: Apr. 8, 2011

(65) Prior Publication Data

US 2011/0220333 A1    Sep. 15, 2011

Related U.S. Application Data

(62) Division of application No. 11/792,500, filed as application No. PCT/AU2006/000025 on Jan. 4, 2006, now abandoned.

(30) Foreign Application Priority Data

Jan. 11, 2005  (AU) ................................ 2005900235

(51) Int. Cl.
*B01F 3/04* (2006.01)
(52) U.S. Cl.
USPC ....................... 261/153; 261/112.2; 165/166
(58) Field of Classification Search
USPC ......... 261/112.2, 153, 154, DIG. 72; 165/166
See application file for complete search history.

(56) References Cited

U.S. PATENT DOCUMENTS

| | | | |
|---|---|---|---|
| 3,262,682 A | 7/1966 | Bredberg | |
| 3,395,903 A | 8/1968 | Norback et al. | |
| 3,450,393 A | 6/1969 | Munters | |
| 3,542,636 A | 11/1970 | Wandel | |
| 3,664,095 A | 5/1972 | Asker et al. | |
| 3,983,190 A | 9/1976 | Norback | |
| 4,099,928 A | 7/1978 | Norback | |
| 4,287,938 A * | 9/1981 | Lagerquist et al. | 165/104.25 |
| 4,544,513 A * | 10/1985 | Otterbein | 261/153 |
| 4,610,902 A | 9/1986 | Eastman et al. | |
| 4,708,832 A | 11/1987 | Norback | |
| 4,977,753 A | 12/1990 | Maisotsenko et al. | |
| 5,124,086 A | 6/1992 | Schultz | |
| 5,167,879 A | 12/1992 | Streng | |
| 5,212,956 A * | 5/1993 | Tsimerman | 62/94 |
| 5,301,518 A | 4/1994 | Morozov et al. | |
| 6,338,258 B1 * | 1/2002 | Lee et al. | 62/310 |
| 6,497,107 B2 * | 12/2002 | Maisotsenko et al. | 62/121 |

(Continued)

FOREIGN PATENT DOCUMENTS

| | | |
|---|---|---|
| GB | 1215544 | 12/1970 |
| JP | 2003020066 | 1/2003 |
| SU | 0979796 A1 | 12/1982 |
| WO | WO03/049844 A1 | 6/2003 |

OTHER PUBLICATIONS

International Preliminary Report on Patentability, Jul. 17, 2007.

(Continued)

*Primary Examiner* — Charles Bushey
(74) *Attorney, Agent, or Firm* — Tarolli, Sundheim, Covell & Tummino LLP

(57) ABSTRACT

A corrugated laminate material (44) for use in an evaporative heat exchanger, said material including a water retaining medium having a wettable surface (40) and an opposed vapour resistant surface (42).

12 Claims, 8 Drawing Sheets

(56) References Cited

U.S. PATENT DOCUMENTS

| | | |
|---|---|---|
| 6,502,807 B1 | 1/2003 | Assaf et al. |
| 6,581,402 B2 | 6/2003 | Maisotsenko et al. |
| 6,776,001 B2 * | 8/2004 | Maisotsenko et al. .......... 62/315 |
| 6,854,278 B2 | 2/2005 | Maisotsenko et al. |
| 7,093,452 B2 * | 8/2006 | Chee et al. ..................... 62/175 |
| 2002/0136885 A1 | 9/2002 | Yaeger et al. |
| 2003/0047821 A1 | 3/2003 | Zich et al. |
| 2004/0061245 A1 | 4/2004 | Maisotsenko et al. |
| 2006/0124287 A1 | 6/2006 | Reinders |
| 2006/0292349 A1 | 12/2006 | Seeley |

OTHER PUBLICATIONS

PCT Written Opinion of the International Searching Authority, Mar. 6, 2006.

* cited by examiner

METHOD AND MATERIALS FOR IMPROVING EVAPORATIVE HEAT EXCHANGERS

CROSS REFERENCES TO RELATED APPLICATIONS

The following application is a divisional application that claims priority to U.S. application Ser. No. 11/792,500, that was pending at the time of filing this application and is now abandoned, application Ser. No. 11/792,500 was filed under 35 U.S. §371 on Jun. 6, 2007 and published under US 2008/0116592 on May 22, 2008, which claims priority to International PCT Application Serial Number PCT/AU2006/000025 having an international filing date of Jan. 4, 2006, which claims priority to Australian Patent Application Serial Number 2005900235 filed on Jan. 11, 2005. This Application claims priority to, and incorporates by reference the above applications in their entirety for all purposes.

FIELD OF THE INVENTION

The present invention relates to improvements in heat exchange capacity of evaporative heat exchangers. In particular, one aspect of this invention relates to a material suited to use in forming heat exchange surfaces of evaporative heat exchangers. Additional inventions are disclosed that relate to the operation of evaporative coolers. For ease of understanding, the aspects of this invention will be described in connection with the heat exchange core of counter flow evaporative coolers, as well as to methods, equipment and systems for the ventilation and cooling of enclosed spaces. The various aspects of this invention can be applied to self-contained air conditioning units suitable for supplying cooled air to an enclosed space, and to self-contained conditioning units suitable for supplying cooled water for use in heat exchange units forming part of a system for the cooling of enclosed spaces.

DESCRIPTION OF THE PRIOR ART

Throughout this description and the claims which follow, unless the context requires otherwise, the word "comprise', or variations such as "comprises" or "comprising", will be understood to imply the inclusion of a stated integer or step or group of integers or steps.

The reference to any prior art in this specification is not, and should not be taken as, an acknowledgement or any form of suggestion that that prior art forms part of the common general knowledge in Australia.

The use of evaporative air coolers for the cooling of enclosed spaces is well known in the art. These coolers are typically constructed with outer walls containing a wettable, permeable media, which is kept wet with water pumped from an internal reservoir. Air from outside the building is drawn through the wetted media by means of a fan located within the evaporative cooler, and delivered either directly into the enclosed space or through a system of ducting to the enclosed space.

As air passes through the wetted media, a phenomenon known as adiabatic saturation takes place. Moisture from the surfaces of the wetted pad evaporates into the air passing through in accordance with the humidity of the air, or its ability to take up additional water vapour. This evaporation causes an exchange of energy wherein the energy required for liquid water to evaporate to a vapour is derived from the water within the wetted pad, thereby cooling the water. The warm air entering the pad is then cooled by heat exchange to the cool water surface. The limit to which air can be cooled by this phenomenon is known as the Wet Bulb Temperature as defined in any reference work on psychrometrics.

The air delivered by an evaporative cooler is cooled to a temperature which is always greater than the Wet Bulb Temperature, to a degree determined by the efficiency of the design of the evaporative cooler. The air delivered is also always more humid than the air entering the cooler. This limitation in achievable temperature and the addition of moisture to the air severely limits the degree of cooling available by this method, as well as limiting the use of this means of cooling to relatively hot, dry climates. In a typically hot, dry location, such as Adelaide, Australia, the design condition for evaporative cooling is 38.degree. C. Dry Bulb Temperature, 21.degree. C. Wet Bulb Temperature. Under these design conditions, a typical evaporative air cooler will deliver air at around 23.5.degree. C., but which has been substantially humidified. This air is much less amenable to providing comfort conditions within the enclosed space than, say, a refrigeratively cooled air conditioning system, which might deliver air at 15.degree. C., and to which no additional moisture has been added.

There is also known, in the prior art methods, that air can be cooled to temperatures below the Wet Bulb Temperature of the incoming air while still using only the evaporation of water as the mechanism of cooling. These methods typically pre-cool the incoming air without the addition of moisture by means of dry heat exchange, prior to the air coming in contact with the moist surfaces for evaporation. The pre-cooling of air without addition of moisture reduces both the Dry Bulb and Wet Bulb temperatures of the air as can be observed on any psychrometric chart. When the air is then brought into contact with the wetted surfaces, it will be cooled to a temperature which approaches the now depressed Wet Bulb Temperature rather than the original Wet Bulb Temperature. If this process is taken to the limit, it is possible to produce cooled air which approaches the Dew Point of the incoming air, without the addition of moisture.

This process of indirect evaporative cooling of air is well known. SU 979796 by Maisotsenko discloses a configuration wherein a main stream of air is passed along a dry duct, simultaneously passing an auxiliary air stream counter currently along a moist duct which is in heat-exchange relation with the dry duct. The auxiliary stream is obtained by subdividing the total stream into main and auxiliary streams.

This configuration is further developed by Maisotsenko in U.S. Pat. No. 4,977,753 wherein the wet and dry ducts are divided into two separate sections which allows for pre-cooling of the dry airstreams prior to their entry into the wet duct thereby resulting in enhanced cooling efficiency.

A practical implementation and method of construction of the configuration of U.S. Pat. No. 4,977,753 is disclosed in U.S. Pat. No. 5,301,518 by Morozov et al. U.S. Pat. No. 5,301,518 discloses a construction consisting of alternating dry ducts, which may be constructed from a variety of materials, and wet ducts constructed from capillary porous material. The airflow configuration is arranged such that the air streams in the dry and wet ducts are in counter flow as in previous disclosures. Furthermore, the configuration divides the heat exchanger into two separate stages for the purpose of achieving the requisite temperature reduction while relieving the high pressure drop inherent in the narrow air passages required for adequate heat transfer. Wetting of the porous material of the wet ducts is achieved by vertical wicking from a water reservoir beneath the heat exchanger.

The disclosure of U.S. Pat. No. 5,301,518 has been demonstrated in practical working machines, which produce air cooled to temperatures approaching the Dew Point without the addition of moisture to the air. However, the construction suffers a number of deficiencies. Resistance to air flow is high as a result of the narrow air passages needed for effective heat transfer. Heat transfer between the wet and dry air passages is inefficient due to the air boundary layers at both sides of the medium between the passages, requiring large surface areas for effective transfer of heat. The heat exchanger height is limited by the ability of the porous wet duct material to wick vertically, which in practical terms is about 200 mm. The available delivered airflow for a given size of heat exchanger is therefore low, resulting in an unacceptably large and costly construction for practical airflows. There are also considerable practical difficulties with the construction and operation of such an indirect evaporative cooler. Manifolding of air streams to the respective wet and dry ducts requires individual separation of the ducts with laborious and expensive sealing systems. When used with normal potable water supplies, water evaporated from the wet duct leaves behind salts, which cannot be easily removed, eventually clogging the heat exchanger.

It is also well known that heat exchange and wet surface evaporation rates from flat, plane surfaces can be greatly enhanced by arranging adjacent surfaces in the form of corrugations set at different angles for each adjacent sheet. This principle was disclosed by Bredberg in U.S. Pat. No. 3,262,682 and Norback in U.S. Pat. No. 3,395,903 for the construction of evaporative media for use in evaporative air coolers and cooling towers. The interaction of air streams within the adjacent corrugations in this construction of wetted media results in intense evaporation from the wet surfaces and intense heat transfer from the cold surfaces formed as a result of that evaporation. A compact, high efficiency evaporative media can be constructed with minimal pressure loss from airflow.

The intensity of evaporation and heat exchange demonstrated in corrugated evaporative media would greatly enhance the performance of an indirect evaporative cooler if applied to the airflow configuration needed for indirect cooling if such media could be readily adapted to that environment.

SUMMARY OF THE INVENTION

A first aspect of the present invention provides a corrugated material for use in an evaporative heat exchanger, said material including a water retaining wettable surface and an opposed vapour resistant surface.

In a preferred embodiment, the shape of the corrugated pattern within the sheets may be varied to optimise thermal performance and airflow resistance when the corrugated material is used in a heat exchange core.

In a second aspect the present invention provides a method of making a corrugated laminate material as described herein, wherein a planar sheet of a water retaining medium is shaped with corrugations by being fed through corrugating rollers.

In a third aspect the present invention provides a heat exchange core for an evaporative heat exchanger formed from at least one sheet of corrugated material as described herein, wherein the at least one sheet is folded to form at least one pocket or fold such that the interior of each fold forms a wettable surface passage or channel or a vapour resistant passage or channel.

In a fourth aspect the present invention provides a heat exchange element for a core of an evaporative heat exchanger, said element being formed from at least two sheets of corrugated laminate material as described herein, wherein the two sheets are joined to form a passage having corrugated walls for airflow therethrough and wherein the corrugations on opposite sides of the passage are at intersecting angles.

In a preferred embodiment, the angle of intersection of the corrugations of adjacent corrugated sheets is varied so as to optimise thermal performance and airflow resistance of the heat exchange core.

A preferred indirect evaporative heat exchanger core is characterised by a construction consisting of individual corrugated wettable media sheets modified to include a vapour impermeable barrier on one side. The individual sheets are constructed into open pockets sealed top and bottom with the vapour impermeable barrier on the inside of the pocket. Said pockets are then assembled into a stack of pockets by sealing each of the non vapour barrier sides together at the air entry end of the stack of pockets such that a complete core is formed wherein warm, dry air enters the core through the pockets, passing all the way through the pockets. Upon exit from the pockets, a proportion of the air so delivered is returned through passages formed between the wettable non-vapour barrier sides of adjacent pockets, which form wet passages of the core.

In a fifth aspect the present invention provides a method of making a heat exchange core comprising taking a plurality of pairs of sheets of corrugated laminate material as described herein, forming a plurality of pockets from pairs of said sheets where the inner surfaces of each pocket are vapour resistant surfaces, adjacent edges of each pair of parallel spaced apart sides being sealed together to form open-ended pockets and stacking said pockets in parallel to form wettable surface airflow passages between each pair of adjacent pockets.

In a sixth aspect the present invention provides an evaporative cooler including a heat exchange core formed from at least one sheet of corrugated laminate material as described herein, wherein the at least one sheet is folded to form at least one pocket or fold such that the interior of each fold forms a wettable surface passage or channel or a vapour resistant passage or channel.

In a seventh aspect the present invention provides a method of effecting heat exchange between counter current airflows in a heat exchanger, said heat exchanger including a heat exchange core comprising wet and dry airflow channels in counter flow, said channels being formed with corrugated walls and wherein entry air is passed down the dry channels to exit as conditioned air, a portion of the exit air being reversed to pass through the wet channels and effect heat exchange between the dry and wet channels before being exhausted.

In relation to a further aspect of the present invention, it is a severe deficiency in prior art indirect evaporative coolers that water must be placed within the wettable media by wicking. This requirement comes about due to the temperature gradient through the wet passage necessary for the cooler to work. The wetted surfaces at the delivery end of the core must be close to the Dew Point of the incoming air if the delivered air temperature is to approach the Dew Point, whereas the wetted surface temperature at the entry end of the core must approach the temperature of the incoming hot dry air if evaporation and heat transfer are to occur. Thus there must be a temperature gradient in the wetted surfaces through the core from the delivery end to the entry end. This gradient can only be achieved by wicking water from a reservoir to the point where it is to evaporate in prior art arrangements. Any surplus of water over this requirement to evaporate and keep the surfaces wet will degrade thermal performance and it will no longer be possible to approach the Dew Point in delivered air temperature. If the wetted surfaces were to be flood irrigated as is the practice with direct evaporative cooling, it would only be possible for the delivered air temperature to approach the Wet Bulb temperature of the incoming air. This temperature can be considerably above the Dew Point depending on incoming air psychrometrics.

In an eighth aspect of the present invention there is provided a method of operating an evaporative cooler which includes a heat exchange core wherein adjacent wet and dry airflow channels are in counter current airflow heat exchange relationship with water being supplied to the wet channels in a descending flow pattern, characterised in that water is supplied to the wet channels over a plurality of segments from an air entry end to an air outlet end of said core during operation of said cooler and wherein water is circulated through each segment relatively separately from adjacent segments such that an appropriate temperature gradient is established from an air inlet end to an air outlet end of the core by maintaining different circulating water temperatures in each segment.

Preferably, the method of the eighth aspect is further characterised by the delivery of water through each water distributor from a respective pumping means associated with each water reservoir.

In a further embodiment, the water reservoirs are each connected to a common water conduit such that water levels in each reservoir are allowed to reach an equilibrium level.

In a ninth aspect the present invention provides a method of operating an evaporative cooler which includes a heat exchange core adapted for heat exchange airflow therethrough via a plurality of heat exchange channels, at least some of said channels being wet channels with water being applied to and retained by wettable material in the wet channels, characterised in that water is applied to the wet channels in an intermittently and generally uniformly descending flow pattern across the entire core and wherein the application of water to the wet channels of the core is repeated before the wettable material has dried out.

In a preferred embodiment, a single pumping means, water spreader and reservoir applies water to the evaporative core periodically.

In a tenth aspect the present invention provides an evaporative cooler including a heat exchange core as described herein having corrugated wet and dry passages or channels, a water distribution system including a plurality of water distributors for wetting the wettable surfaces of the passages or channels, said water distributors being positioned above the core and disposed in spaced apart parallel relation transversely of the core relative to an airflow direction through the core, each water distributor being located within a respective space above the core separate from adjacent water distributor spaces, each water distributor being supplied from a respective reservoir, and further including flow restriction means at an airflow exit of the vapour resistant channels for effecting counter flow of a portion of the exit air through the wet channels to an exhaust.

The inventive aspects of the present invention when combined can result in an indirect evaporative cooler which fully utilises the characteristics of corrugated media to produce a compact, efficient and economical cooler. Such an indirect evaporative air cooler typically comprises a fan means for the delivery of air, an indirect evaporative heat exchanger and an air delivery means including an airflow resistance means.

BRIEF DESCRIPTION OF THE DRAWINGS

Embodiments of aspects of the present invention will now be described by way of example with reference to the accompanying drawings, in which.

DESCRIPTION OF EMBODIMENTS

Figure 1:
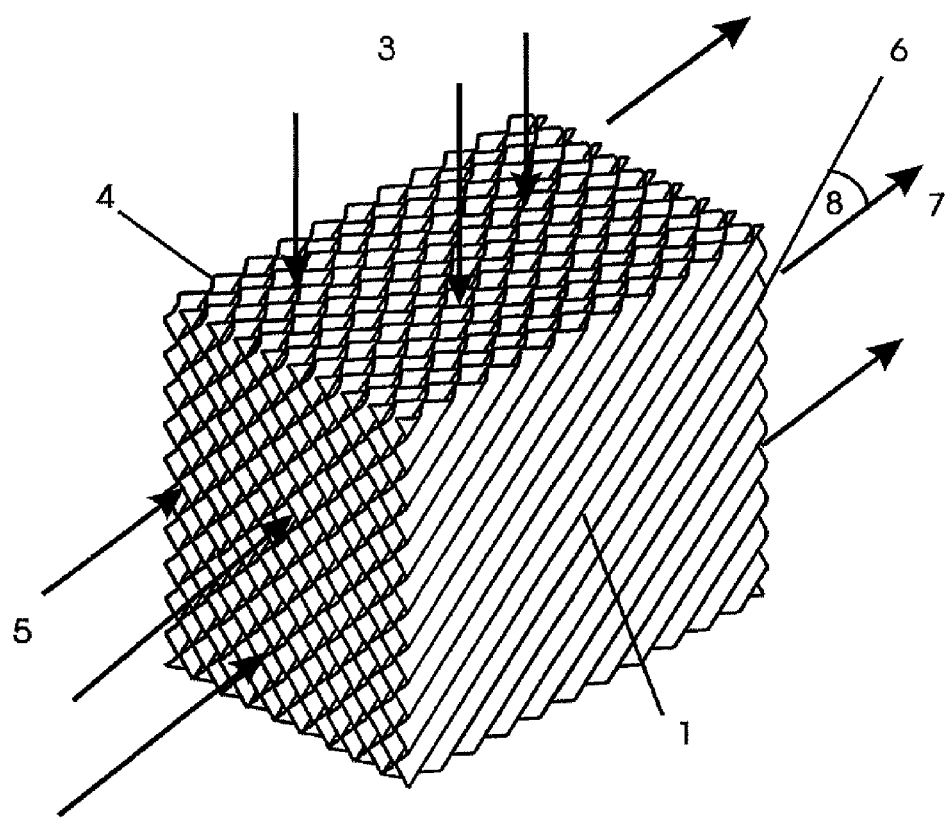
FIG. 1 is an isometric view of the construction of a prior art corrugated evaporative media.

In FIG. 1, the prior art corrugated media is shown as a block of sheets of corrugated, wettable media within which dry air and water on the wetted surfaces interact. The block 1 is constructed from individual sheets 4 of corrugated media (typically treated paper of a type which readily wicks water along its surface). Individual corrugations 6 are impressed in the media during manufacture and the sheets arranged such that the corrugations are set at an angle 8 to the edges of the block of media. Adjacent sheets 4 are typically glued together with reversed corrugation angles creating complex air and water passages within the matrix of the block.

In operation, water is introduced in the direction 3 and applied to the top surface of the block of media. As the water 3 descends through the matrix, it encounters numerous points within the matrix where the corrugations 6 of adjacent sheets 4 meet. At each of these intersection points, part of the water is directed one way around the intersection, and the remainder of the water the opposite way around the intersection. Since there are numerous such intersections within the matrix, the water is quickly spread evenly throughout the block of media, thereby ensuring even wetting of the surfaces. The distribution of water within the matrix is further enhanced by the property of the media to readily wick water along its surface. Thus any deficiencies in the evenness of water distribution throughout the surfaces of the matrix are readily compensated and corrected.

Hot, dry air 5 enters the matrix and also encounters numerous intersections of the adjacent corrugated sheets. At each intersection, the air is divided into two streams ensuring uniform movement of air throughout the matrix. At each of these intersections there is intense interaction between the air and the wetted surfaces due to the rapid and frequent changes in direction of the airflow. This intense interaction results in rapid evaporation of water from the wetted surfaces, thereby humidifying the air and cooling the waters on the wetted surfaces. Since the wetted surfaces are then considerably cooler than the hot dry incoming air, heat exchange will then occur between the air and the wetted surface, thereby cooling the air. Air leaves the matrix block as cooled, humidified air 7. The heat exchange during this process is also intensified due to the numerous interaction sites at the intersections of corrugations for the same reasons as for intensified evaporation espoused above.

Figure 2:
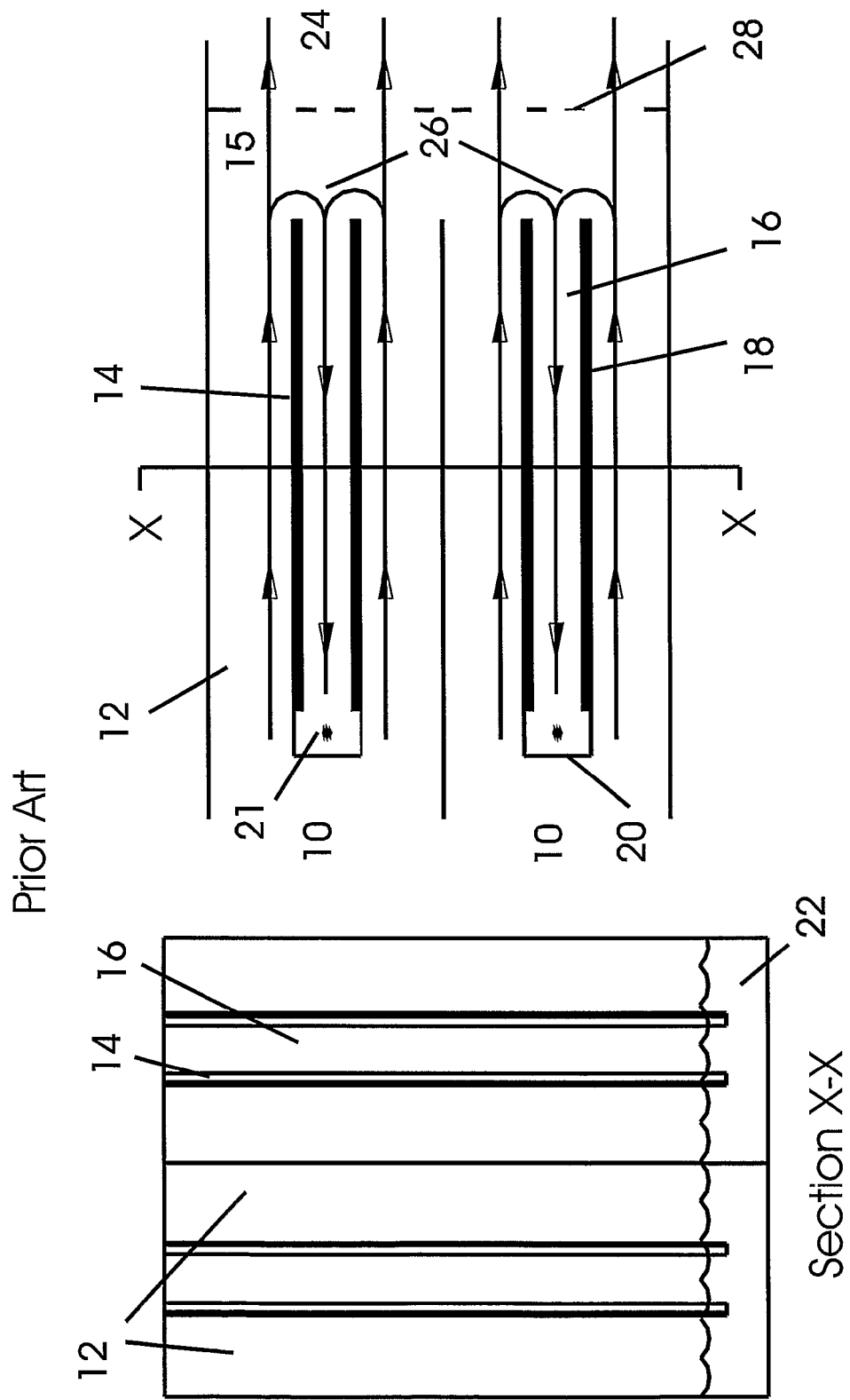
FIG. 2 shows schematic views of airflow paths and a water distribution method of a prior art indirect evaporative cooler.

In FIG. 2, a prior art indirect evaporative cooler construction is shown. Hot, dry air 10 enters the dry air passage 12, proceeding past the dry air passage boundary 14. When the construction has been operating for at least a short period, the dry air passage boundary 14 will be cooler than the dry air entering the passage 12. Heat exchange will occur and the dry air will be progressively cooled as it proceeds down the dry air passage.

The incoming hot dry air 10 has been cooled considerably when it leaves the dry air passage 14 at 15. A flow resistance device 28 is installed in the airflow path thereby causing an increase in air pressure at 15. This increase in pressure causes some of the now cool, dry air to turn at 26, and proceed through the wet air passage 16. The wet air passage contains a wetted media 18, kept moist by the wicking of water from a water reservoir 22. Since the air has not yet had any change in its moisture content, evaporation takes place from the wetted media 18 thereby humidifying the air and cooling the water within the wetted media by the same mechanism described above for evaporative media. As the air continues its flow down the wet passage, heat from the adjacent dry passage 12 will tend to raise the temperature of the now moistened air 26, thereby increasing its ability to evaporate moisture further. Further evaporation and heating takes place until the air 26 reaches a barrier in its path at 20, causing it to flow to exhaust 21.

Air which flows through the flow resistance 28 becomes the delivered air 24. This air has been cooled without the addition of moisture. In the limit of low airflows and good heat exchange, the temperature of delivered air 24 can approach the Dew Point of the incoming air.

Figure 3:
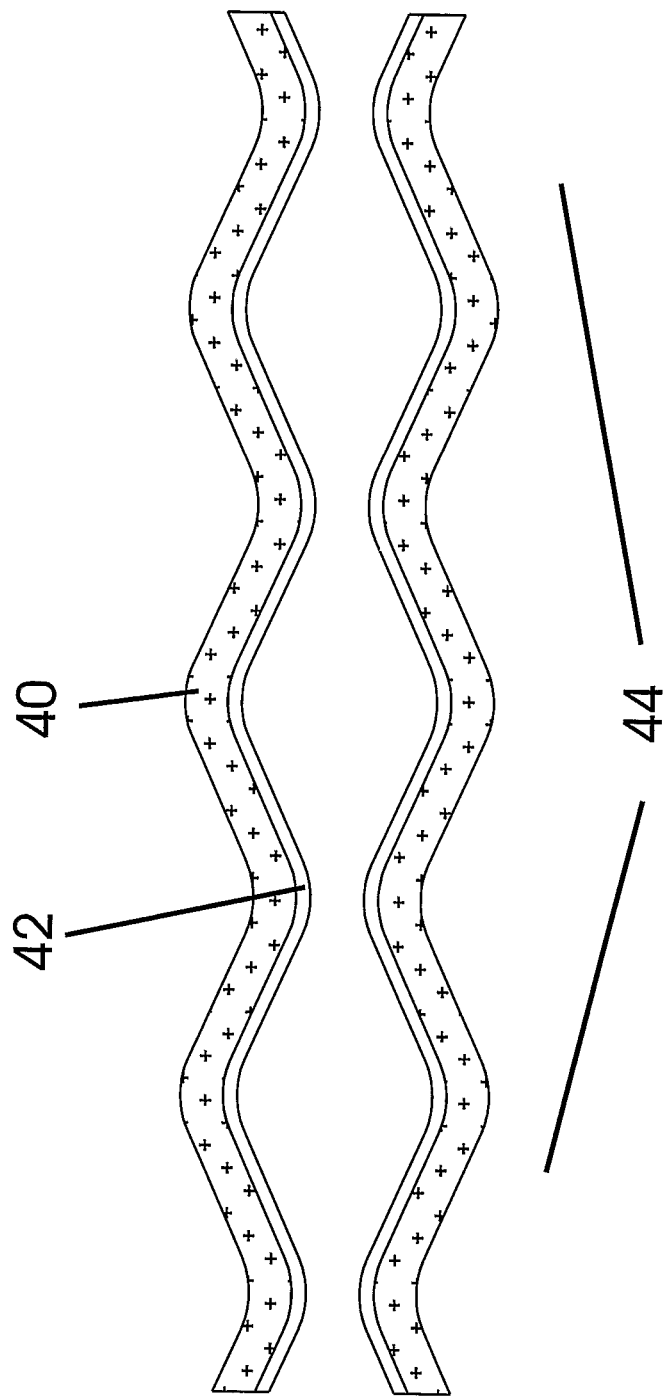
FIG. 3 is a sectional view of a dry channel showing the construction of an embodiment of corrugated media in accordance with the invention.

FIG. 3 shows an element of the construction of the current invention. A corrugated wettable media 40 (which may be made using similar materials and manufacturing methods to that of individual sheets 4 of the evaporative media described above) is manufactured with a vapour resistant membrane 42 adhered to one side. The membrane 42 may be a polymer material, although the only essential property is that it resist the flow of water vapour. It may be applied by a number of methods, including hot calendaring of plastic, adhering plastic film or the application of liquid polymers (e.g. paint), or it may be formed by treatment of the surface of the wettable media. The vapour membrane should be kept as thin as practicable for maximum heat transfer. The wettable media 40 should also be as thin as practicable consistent with its requirement to keep the surface wet and wick water to areas not directly wetted in the constructed cooler.

In the construction described above, the wettable media 40 from which the core elements 44 are made can be manufactured from any material which can be readily wetted. Practical materials include treated, wettable paper, moulded paper fibre slurry, wettable particulate sintered polymers and metallic or polymer films with treated or modified surfaces to promote wetting. Those skilled in the art will be aware of other wettable materials which may be used in the construction of the current invention.

Further, the core elements 44 may be produced using a moulding process wherein the shape of the corrugated passages may be modified to further facilitate the optimisation of airflow and heat transfer. In particular, the air passages through which exhaust air leaves the core may be shaped to reduce the airflow pressure losses associated with turning the air within the core from the general flow direction to a general exhaust direction.

Figure 4:
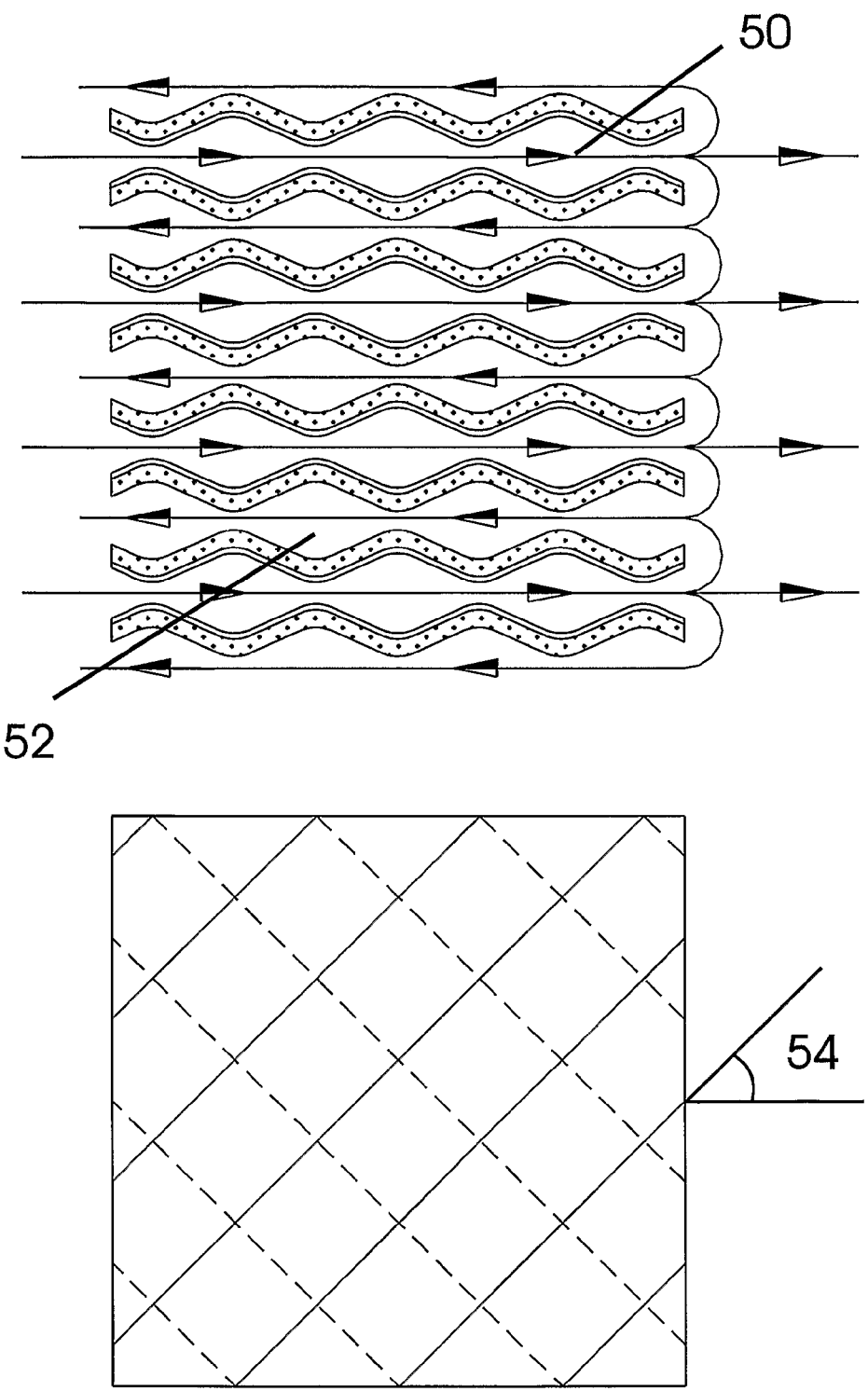
FIG. 4 shows a sectional view and schematic of a segment of an indirect evaporative cooler core made from the corrugated media of FIG. 3.

FIG. 4 shows the component part described in FIG. 3 as part of the heat exchanger and evaporation core of the indirect evaporative cooler, the current invention. In the complete construction, dry, hot airflows through the dry air passage 50, where the dry air passage is contained between the vapour resistant surfaces 42 of the corrugated sheets 44. Adjacent wet passages 52 are formed between the wettable media surfaces 40. Airflows through the dry passages 50 in general counter flow to the wet passages 52.

The angle at which corrugations are set to the general direction of airflow is illustrated by the angle 54. This angle may be varied over a wide range to optimise the efficiency of heat transfer and resistance to airflow in the core. In general, a shallower angle 54 will result in lower airflow resistance at the penalty of reduced heat transfer efficiency.

In another embodiment, the angle of corrugation 54 within the core is made relatively shallow, typically in the range 20 degrees to 35 degrees. The shallow angles of corrugation significantly reduce the airflow resistance through the core to the detriment of heat transfer efficiency. Heat transfer efficiency can be regained by extending the overall length of the core. It is found that within the range of angles stated herein, an optimised combination of reduced airflow resistance and increased core length can be achieved for each construction, consistent with adequate heat transfer efficiency.

Figure 5:
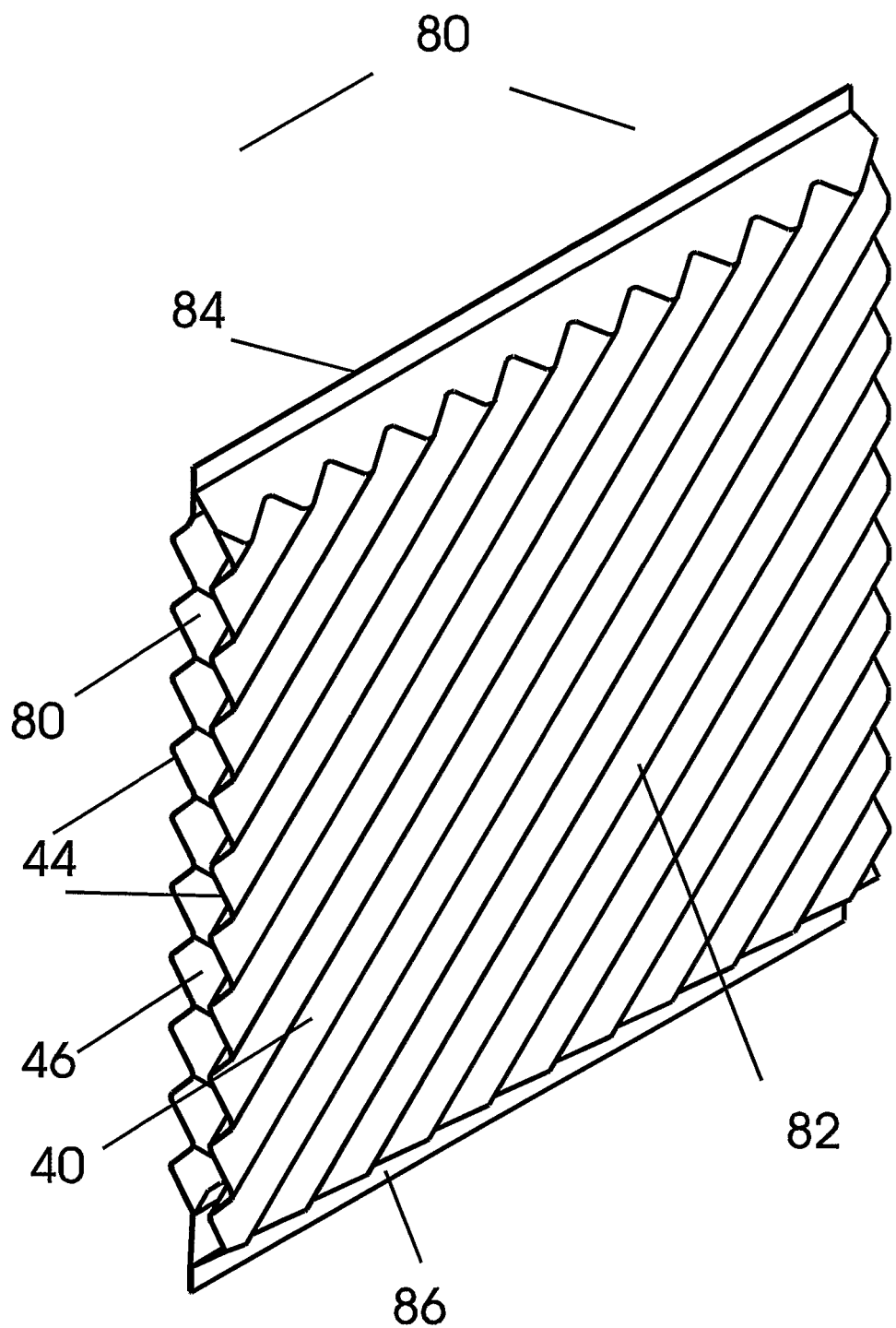
FIG. 5 is an isometric view, which shows an embodiment of the construction of a pocket segment of an indirect evaporative cooler core employing corrugated media of the present invention.

FIG. 5 shows the detail of construction of the components described in FIG. 4 to achieve the flow patterns and directions required. Individual pockets 88 are constructed from two corrugated sheets with vapour resistant membranes 44. Each corrugated sheet 44 is positioned with the vapour resistant membrane 42 facing the vapour resistant membrane of the adjacent sheet. The sheets are sealed together at the top seal 84 and bottom seal 86, thus forming a complete pocket with all inner surfaces lined with a vapour resistant membrane 42. The top seal 84 and bottom seal 86 can be formed by methods including clinching, adhesives, plastics welding or fillers. Alternatively, if the vapour resistant membrane is formed from plastic film adhered to the wettable media 40, one of either the top seal or bottom seal can be formed by folding of a double size sheet of media and membrane combination.

Figure 6:
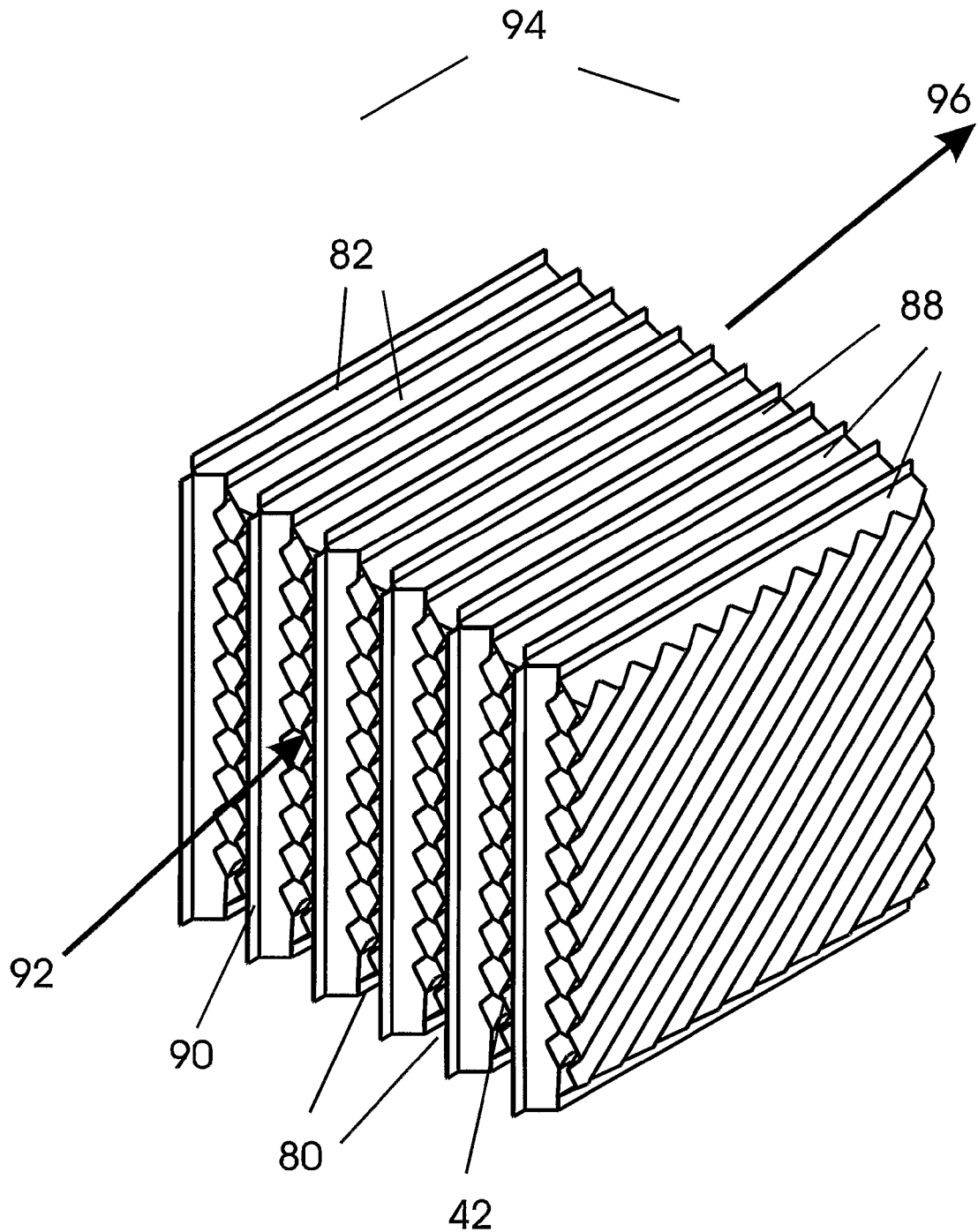
FIG. 6 is an isometric view of an assembly of pocket segments of FIG. 5 when formed into an indirect evaporative cooler core.

This construction results in a sealed lined pocket through which hot dry air can flow with no physical contact with the wettable media in passage 80. FIG. 6 shows the stacking of several of the pockets 88 formed into an indirect cooler core 94. When successive pockets are placed in a stack adjacent to each other, adjacent wettable media surfaces then form the wet passage 82. Air flowing through the wet passage 82 has no physical contact with the dry passage 80, but heat exchange between the wet and dry passages and evaporation within the wet passage can readily take place with the intensity promoted by the corrugated construction.

Adjacent pockets 88 need to have the wet passages 82 separated from the dry passages 80 at the end of the core through which hot, dry air enters the core. This is achieved by sealing together adjacent pockets on the wettable media side with a seal line 90 formed by similar methods to the seals at the top and bottom of the pockets (84 and 86). With this construction, hot, dry air entering from 92 can only enter and flow through the pockets 88 lined with vapour resistant membranes 42, and must travel all the way through the pocket until it exits at the opposite end 96.

Figure 7:
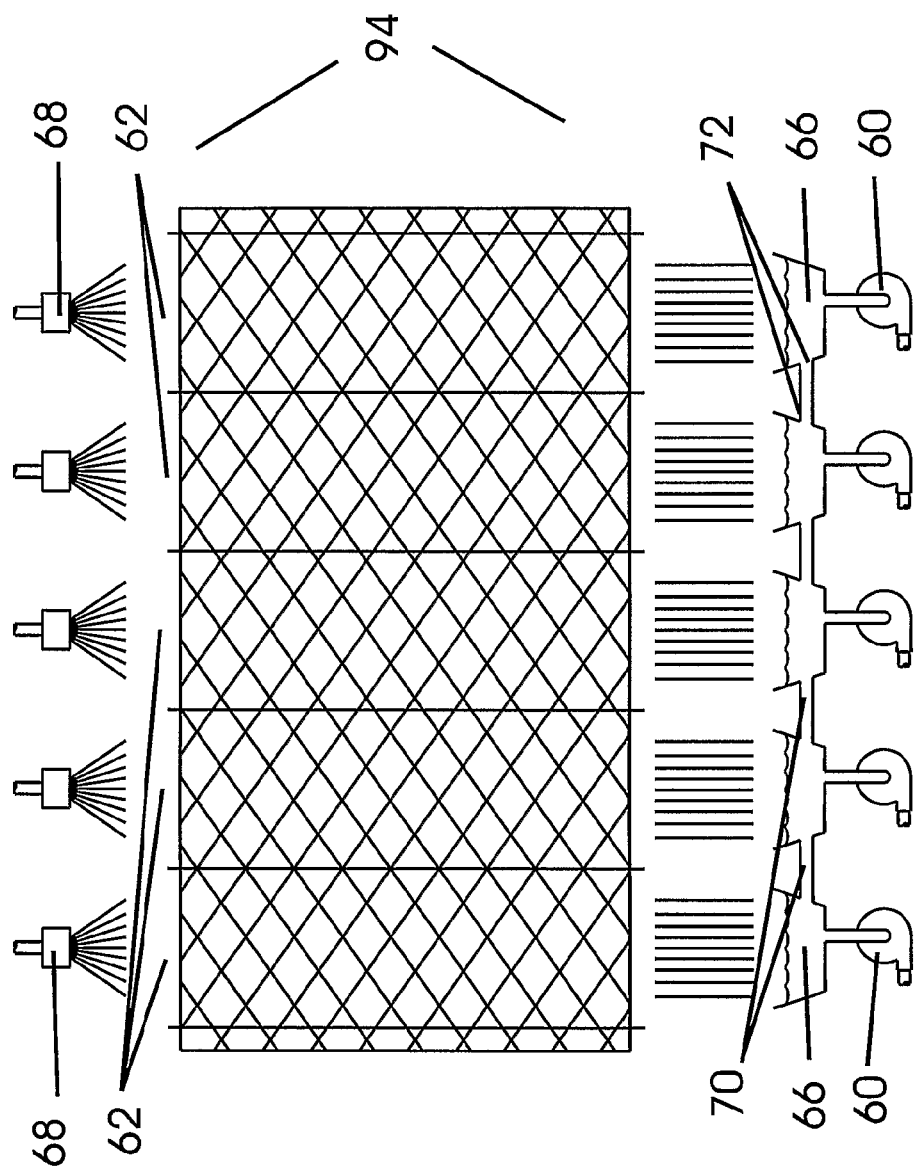
FIG. 7 is a schematic showing the water distribution system of another aspect of the present invention where the heat exchange core is divided into segments.

FIG. 7 shows an arrangement in accordance with an embodiment of the eighth aspect of the present invention for wetting of the wettable media in the wet passages in a segmented manner.

The arrangement of FIG. 1 divides the core 94 into a number of segments 62 (shown as five segments in FIG. 7, but a lesser or greater number of segments could be used). Each segment has its own pumping means 60, its own water reservoir 66 and its own water distribution system 68. The segment 62 of core 94 with its corrugated construction, tends to pass water from the water distributor 68, through the core 94 to the water reservoir 66 with little mixing of water from adjacent segments. Since, in operation, all segments are circulating water simultaneously, any tendency of the circulating water in a segment to pass through to an adjacent segment is approximately balanced by an equal and opposite tendency for water to come back from that adjacent segment. Thus, for each segment water is circulated relatively independently of each of the adjacent segments. The circulating water temperature in each of the segments can therefore be different, thus providing the temperature gradient necessary to thermal performance of the indirect evaporative cooler, and thus allow the delivered air temperature to approach the Dew Point. This arrangement for water supply to the core has several advantages over the prior art, including removal of the restriction on core height due to the wicking capability of the wettable media; water flow surplus to the requirement for evaporation flushes away any salt concentration due to evaporation and water quality can be easily monitored for salt concentration and diluted before critical concentrations are reached.

This arrangement would approach the ideal wetting condition of wicking if there were many segments. Thermal performance is compromised if there are too few segments. In practice it has been found that dividing the core into 4-6 segments gives thermal performance approaching a wicking system with a considerably more robust and enduring core for practical applications.

In practical examples, it has been found that water descending through the core does not remain in separated segments as in the ideal case. There is, in practice, some drift of water between the segments resulting in the accumulation of water in some segment water reservoirs, and a deficiency of water in other segments. This practical difficulty is overcome by the provision of a bypass conduit 70 between the reservoirs, where the bypass conduit 70 is connected to each of the segment water reservoirs via an opening 72. Should the surplus/deficiency problem of water descending through the core arise, water level variations in the reservoirs 66 will equalise through the conduit 70 until a steady state of flow between the reservoirs is established. This arrangement also allows for water filling at one reservoir only, by allowing water levels to again equalise according to the steady state requirements of the individual segments.

In an alternative arrangement in accordance with the ninth aspect of the present invention, the segmented water distribution system of FIG. 7 is replaced with a single, general uniform means of distributing water over the entire core, a single water pump means, and a single water reservoir at the bottom of the core 94. In this embodiment, water is applied to the core intermittently. The single water pump 60 is operated for a short period of time sufficient to uniformly wet all of the internal surfaces of the core, and is then turned off. The indirect evaporative cooler is then continued in operation, cooling by means of evaporation of the water contained on its internal surfaces. Since there is no further flow of water through the wetted surfaces of the core during this phase of operation, the wetted surfaces will cool to temperatures similar to the temperatures of an indirect evaporative core wetted by means of wicking as in the prior art. The requirements of thermal gradient within the wetted passages are met, and thermal performance of the core is not significantly degraded. The wetting operation by means of the pump 60 is repeated before the wetted surfaces of the core are dried out, resulting in some degradation of thermal performance during the wetting phase. Typically, with the selection of wettable media materials with reasonable water holding capacity, the core can be wetted in 30-60 seconds, and the indirect cooler operated without further wetting for 15-20 minutes without the wetted surfaces in the core drying out significantly.

Figure 8:
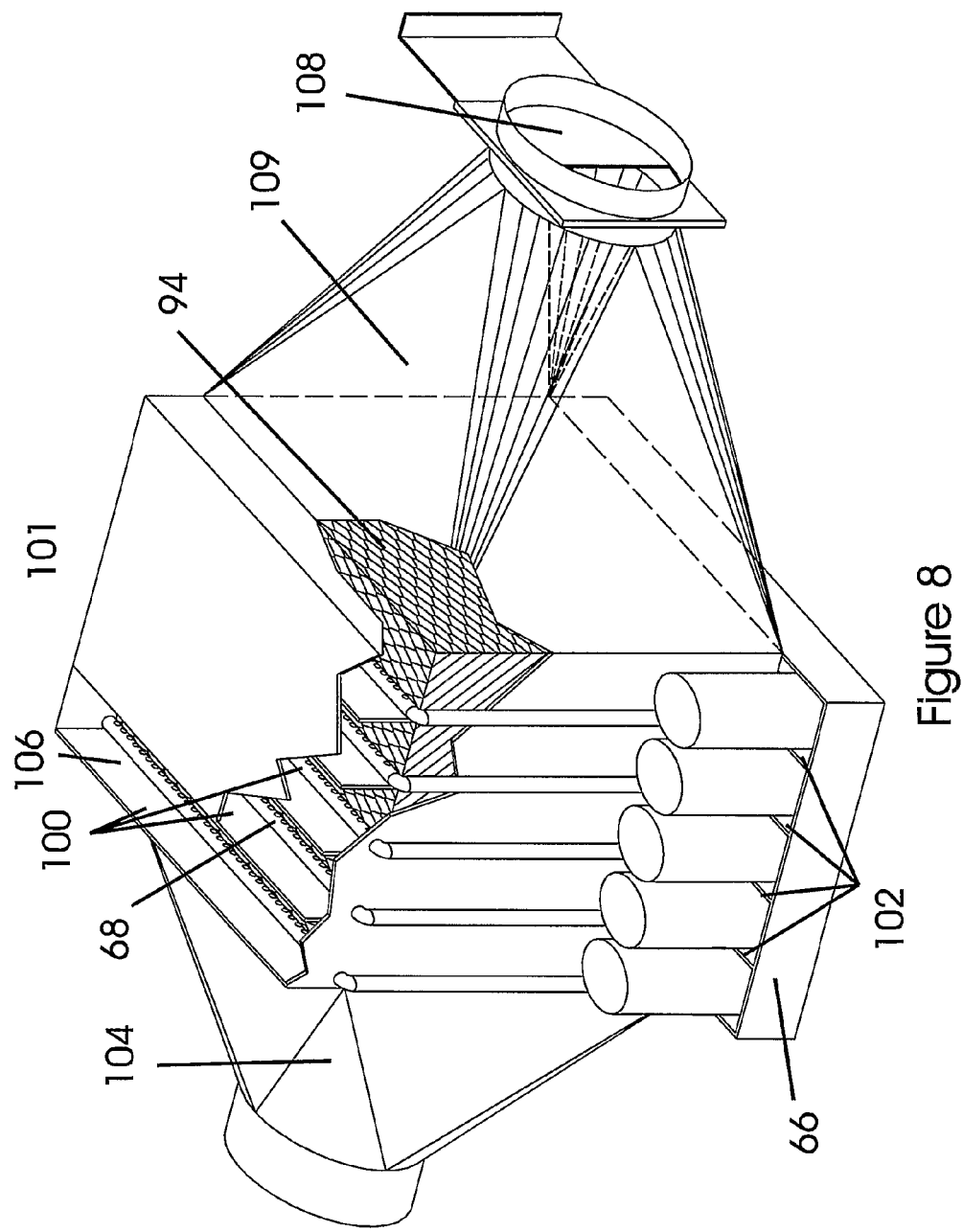
FIG. 8 is an isometric view of an assembled indirect evaporative cooler core detailing water and airflow systems.

FIG. 8 shows the complete core 94 with the water distribution system 68 and the airflow system 104 in place. Each water distributor is located within a space 101 kept separate from the water distributor space of adjacent segments by barriers 100. The sealed spaces 101 and barriers 100 are necessary to prevent airflow exiting from the wet passages of the core thereby causing air in the wet passages to travel all the way along the wet passages. A similar sealing system is necessary to separate the water reservoir 66 from adjacent water reservoirs. Each water reservoir 66 is sealed to the core by barriers 102 thus preventing any air from leaving the wet passages through the water reservoirs.

Immediately after the entry end of the core, the wet passage space is left open at 106. The opening 106 allows the now moist, warm air flowing in the wet passages to exhaust from the core 94. In the preferred embodiment, an exhaust opening 106 is provided at both the top and bottom of the core although only the top opening is shown in FIG. 8. However, if provision of the opening 106 at the bottom of the core is impracticable, satisfactory performance can still be achieved with only the opening 106 at the top with some degradation of thermal performance.

The ratio of delivered air to exhaust air is adjusted by means of a flow restriction 108 in the delivered air stream. Closing flow restriction 108 increases the pressure in chamber 109 at the delivery end of the core 94, thereby increasing the flow of air back through the wet air passages.

The invention claimed is:

1. A method of effecting heat exchange between counter current airflows in an evaporative heat exchanger, said heat exchanger including a heat exchange core comprising a plurality of alternating wet and dry passages, each passage comprising opposed corrugated surfaces with corrugations of said opposed corrugated surfaces being at intersecting angles, the opposed corrugated surfaces of each wet passage including a water wettable material adapted to retain water and transfer water vapour from the wettable material to air flowing along each respective wet passage;

the corrugated surfaces of each dry passage being vapour resistant and cooled as water vapour transfers from the wettable material to air flowing along each adjacent wet passage, and causing a portion of the airflow exiting the dry passages to be returned to the wet passages in counter flow to the airflow in the dry passages, characterised in directing the counter current airflows in the wet and dry passages in a substantially horizontal direction, supplying water from above the core to the wettable material of the wet passages in a descending flow pattern and preventing water from entering and descending the dry passages.

2. A method as claimed in claim 1, including supplying water to the wet passages in an intermittently and generally uniformly descending flow pattern across the entire core and repeating application of water to the wet passages of the core before the wettable material has dried out.

3. A method as claimed in claim 2, including periodic application of water flows, surplus to requirements for evaporation, to the wet passages for flushing away of any salt concentration in the wet passages.

4. A method of effecting heat exchange between counter current airflows in an evaporative heat exchanger, said heat exchanger including a heat exchange core comprising a plurality of alternating wet and dry passages, each passage comprising opposed corrugated surfaces, the opposed corrugated surfaces of each wet passage including a water wettable material adapted to retain water and transfer water vapour from the wettable material to air flowing along each respective wet passage;

the corrugated surfaces of each dry passage being vapour resistant and cooled as water vapour transfers from the wettable material to air flowing along each adjacent wet passage, and causing a portion of the airflow exiting the dry passages to be returned to the wet passages in counter flow to the airflow in the dry passages, characterised in directing the counter current airflows in the wet and dry passages in a substantially horizontal direction, supplying water from above the core to the wettable material of the wet passages in a descending flow pattern and preventing water from entering and descending the dry passages; and supplying water to the wet passages over a plurality of segments from an air entry end to an air outlet end of said core during operation of said heat exchanger and circulating water through each segment relatively separately from adjacent segments such that an appropriate temperature gradient is established from an air inlet end to an air outlet end of the core by maintaining different circulating water temperatures in each segment.

5. A method as claimed in claim 4, including periodic application of water flows, surplus to requirements for evaporation, to the wet passages for flushing away of any salt concentration in the wet passages.

6. An evaporative heat exchanger adapted to operate in counter current airflow, said heat exchanger having a heat exchange core comprising a plurality of alternating wet and dry passages, each passage comprising opposed corrugated surfaces with corrugations of said opposed corrugated surfaces being at intersecting angles, the opposed corrugated surfaces of each wet passage including a water wettable material adapted to retain water and transfer water vapour from the wettable material to air flowing along each respective wet passage;

the corrugated surfaces of each dry passage being vapour resistant and being adapted to be cooled as water vapour transfers from the wettable material to air flowing along each adjacent wet passage, and means for directing a portion of the airflow exiting the dry passages to become airflow in the wet passages, characterised in that, in use, the counter current airflow direction is substantially horizontal in the wet and dry passages and including means for supplying water from above the core to the wettable material of the wet passages in a descending flow pattern and means for preventing water from entering and descending the dry passages.

7. An evaporative heat exchanger as claimed in claim 6, wherein the means for supplying water includes single pumping means to periodically feed water to a water spreader above the core from a reservoir.

8. An evaporative heat exchanger adapted to operate in counter current airflow, said heat exchanger having a heat exchange core comprising a plurality of alternating wet and dry passages, each passage comprising opposed corrugated surfaces, the opposed corrugated surfaces of each wet passage including a water wettable material adapted to retain water and transfer water vapour from the wettable material to air flowing along each respective wet passage;

the corrugated surfaces of each dry passage being vapour resistant and being adapted to be cooled as water vapour transfers from the wettable material to air flowing along each adjacent wet passage, and means for directing a portion of the airflow exiting the dry passages to become airflow in the wet passages, characterised in that, in use, the counter current airflow direction is substantially horizontal in the wet and dry passaggs and including means for supplying water from above the core to the wettable material of the wet passages in a descending flow pattern and means for preventing water from entering and descending the dry passages wherein the means for supplying water comprises a water distribution system including a plurality of water distributors for the wet passages, said water distributors being positioned above the core and disposed in spaced apart parallel relation transversely of the core relative to an airflow direction through the core, each water distributor being located within a respective space above the core separate from adjacent water distributor spaces, each water distributor being supplied from a respective reservoir, and wherein the means for directing a portion of the airflow includes flow restriction means at an airflow exit of the dry passages.

9. An evaporative heat exchanger as claimed in claim 8, including respective pumping means associated with each reservoir for delivering water to each respective water distributor.

10. An evaporative heat exchanger as claimed in claim 8, wherein the water reservoirs are each connected to a common water conduit such that water levels in the reservoirs are allowed to reach an equilibrium level.

11. An evaporative heat exchanger as claimed in claim 9, wherein the water reservoirs are each connected to a common water conduit such that water levels in the reservoirs are allowed to reach an equilibrium level.

12. A method of effecting heat exchange between counter current airflows in an evaporative heat exchanger, said heat exchanger including a heat exchange core comprising a plurality of alternating wet and dry passages, each passage comprising opposed corrugated surfaces with corrugations of said opposed corrugated surfaces being at intersecting angles, the opposed corrugated surfaces of each wet passage including a water wettable material adapted to retain water and transfer water vapour from the wettable material to air flowing along each respective wet passage;

the corrugated surfaces of each dry passage being vapour resistant and cooled as water vapour transfers from the wettable material to air flowing along each adjacent wet passage, and causing a portion of the airflow exiting the dry passages to be returned to the wet passages in counter flow to the airflow in the dry passages, characterised in directing the counter current airflows in the wet and dry passages in a substantially horizontal direction, supplying water from above the core to the wettable material of the wet passages in a descending flow pattern and preventing water from entering and descending the dry passages; and providing periodic application of water flows, surplus to requirements for evaporation, to the wet passages for flushing away of any salt concentration in the wet passages.

* * * * *